US012395256B2

United States Patent
Garcia Rodriguez et al.

(10) Patent No.: US 12,395,256 B2
(45) Date of Patent: Aug. 19, 2025

(54) ESTIMATING SIGNAL LEAKAGE FOR MULTI-CHANNEL OPERATION

(71) Applicant: NOKIA TECHNOLOGIES OY, Espoo (FI)

(72) Inventors: Adrian Jose Garcia Rodriguez, Santa Cruz de Tenerife (ES); Olli Alanen, Vantaa (FI); Dani Korpi, Helsinki (FI); Lorenzo Galati Giordano, Stuttgart (DE); Mika Kasslin, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 369 days.

(21) Appl. No.: 18/004,078

(22) PCT Filed: May 21, 2021

(86) PCT No.: PCT/FI2021/050366
§ 371 (c)(1),
(2) Date: Jan. 3, 2023

(87) PCT Pub. No.: WO2022/003235
PCT Pub. Date: Jan. 6, 2022

(65) Prior Publication Data
US 2023/0261771 A1  Aug. 17, 2023

(30) Foreign Application Priority Data
Jul. 3, 2020 (FI) ..................................... 20205717

(51) Int. Cl.
*H04B 17/354* (2015.01)
*H04W 74/08* (2024.01)
*H04W 74/0808* (2024.01)

(52) U.S. Cl.
CPC ...... *H04B 17/354* (2015.01); *H04W 74/0808* (2013.01)

(58) Field of Classification Search
CPC .......................... H04W 74/0808; H04B 17/354
See application file for complete search history.

(56) References Cited

U.S. PATENT DOCUMENTS

2017/0013469 A1 1/2017 Larsson et al.
2019/0053277 A1 2/2019 Leinonen et al.
(Continued)

FOREIGN PATENT DOCUMENTS

GB       2567896 A     5/2019
WO  WO 2015/144200 A1  10/2015

OTHER PUBLICATIONS

Extended European Search Report for European Application No. 21831634.7 dated Oct. 10, 2023, 9 pages.
(Continued)

*Primary Examiner* — Derrick V Rose
(74) *Attorney, Agent, or Firm* — ALSTON & BIRD LLP

(57) ABSTRACT

Disclosed is a method comprising measuring a first power value in a first channel before transmitting a first signal in a second channel A first transmit power value is then determined for transmitting the first signal in the second channel. In addition, a second power value in the first channel is estimated, while transmitting the first signal in the second channel, wherein the second power value is estimated based on at least the measured first power value and the first transmit power value. Further, a third power value is measured in the first channel, while transmitting the first signal in the second channel.

20 Claims, 11 Drawing Sheets

(56) References Cited

U.S. PATENT DOCUMENTS

| | | |
|---|---|---|
| 2019/0082463 A1 | 3/2019 | Patil et al. |
| 2019/0230706 A1 | 7/2019 | Li et al. |
| 2020/0022183 A1 | 1/2020 | Bhorkar et al. |
| 2020/0128490 A1 | 4/2020 | Wilhelmsson et al. |
| 2020/0145890 A1 | 5/2020 | Ma et al. |
| 2022/0132572 A1* | 4/2022 | Fang .................. H04W 72/542 |
| 2022/0159720 A1* | 5/2022 | Tao .................. H04W 74/0808 |

OTHER PUBLICATIONS

Taewon Song (LG Electronics), "Multi-Link Acknowledgement Follow Up", IEEE Draft, IEEE 802.11-20/0012r3, (Jan. 2020), 12 pages.

Winsu Murti (SeoulTech) et al., "Performance and Fairness of Multi-link Operation", IEEE Draft, IEEE 802.11-19/1633r1, (Nov. 2019), 19 pages.

Yongho Seok, (MediaTek), "Multi-Link Triggered Uplink Access", IEEE Draft, IEEE 802.11-20/0188r3, (Jan. 2020), 17 pages.

Boulogeorgos et al., "Spectrum Sensing in Full-Duplex Cognitive Radio Networks Under Hardware Imperfections", IEEE Transactions on Vehicular Technology, vol. 66, No. 3, (Mar. 2017), 13 pages.

Cariou, L., "802.11 EHT Proposed PAR," IEEE 802.11-18/1231r6, (Mar. 2019), 4 pages.

Gokceoglu et al., "Energy Detection under IQ Imbalance with Single- and Multi-Channel Direct-Conversion Receiver: Analysis and Mitigation," IEEE Journal on Selected Areas in Communications, vol. 32, No. 3, (Feb. 20, 2014), 14 pages.

International Search Report and Written Opinion for Patent Cooperation Treaty Application No. PCT/FI2021/050366 dated Aug. 24, 2021, 12 pages.

Kim et al., "A Dual Threshold Listen-Before-Talk for Unlicensed LTE Systems", EURASIP Journal on Wireless Communications and Networking, (Jul. 2019), 14 pages.

Lagen et al., "New Radio Beam-Based Access to Unlicensed Spectrum: Design Challenges and Solutions", arXiv:1809.1443v2, (Oct. 23, 2019), 30 pages.

Liao et al., "Full duplex cognitive radio: a new design paradigm for enhancing spectrum usage", IEEE Communications Magazine, vol. 53, No. 5, (Mar. 2015), 19 pages.

Lopez-Perez et al., "IEEE 802.11be Extremely High Throughput: The Next Generation of Wi-Fi Technology Beyond 802.11ax," arXiv:1902.04320v2, IEEE Comm. Mag., vol. 57, No. 9, (Sep. 2019), 6 pages.

Meng et al., "IEEE 802.11 Real Time Applications TIG Report," IEEE 802.11-19/2009r6, (Nov. 2018), 43 pages.

Naribole et al., "Multi-link Channel Access Discussion Follow-up", IEEE 802.11-19/1836r4, (Nov. 2019), 21 pages.

Notice of Allowance for Finland Application No. 20205717 dated Jan. 28, 2021, 7 pages.

Song et al., "Coexistence of Wi-Fi and Cellular with Listen-Before-Talk in Unlicensed Spectrum", IEEE Communication Letters, vol. 20, Issue 1, (Jan. 2016), 4 pages.

Vu et al., "Power Leakage-Aware Multi-Carrier LBT for LTE-LAA in Unlicensed Spectrum", 2018 IEEE International Symposium on Dynamic Spectrum Access Networks (DySPAN), (Jan. 13, 2019), 10 pages.

Intention to Grant for European Application No. 21831634.7 dated Mar. 14, 2025, 44 pages.

* cited by examiner

ESTIMATING SIGNAL LEAKAGE FOR MULTI-CHANNEL OPERATION

CROSS-REFERENCE TO RELATED APPLICATIONS

This application is a national phase entry of International Application No. PCT/FI2021/050366, filed May 21, 2021, which claims priority to European Patent Application No. 20205717, filed Jul. 3, 2020, the contents of which are hereby incorporated by reference in their entirety.

FIELD

The following exemplary embodiments relate to wireless communication.

BACKGROUND

As resources are limited, it is desirable to optimize the usage of network resources. A wireless communication device may be utilized to enable better usage of resources and/or to provide enhanced user experience to a user of the device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: measure a first power value in a first channel before transmitting a first signal in a second channel; determine a first transmit power value in the second channel for transmitting the first signal in the second channel; estimate a second power value in the first channel, while transmitting the first signal in the second channel, wherein the second power value is estimated based on at least the measured first power value and the first transmit power value; and measure a third power value in the first channel, while transmitting the first signal in the second channel.

According to another aspect, there is provided an apparatus comprising means for measuring a first power value in a first channel before transmitting a first signal in a second channel; determining a first transmit power value in the second channel for transmitting the first signal in the second channel; estimating a second power value in the first channel, while transmitting the first signal in the second channel, wherein the second power value is estimated based on at least the measured first power value and the first transmit power value; and measuring a third power value in the first channel, while transmitting the first signal in the second channel.

According to another aspect, there is provided a system comprising means for measuring a first power value in a first channel before transmitting a first signal in a second channel; determining a first transmit power value in the second channel for transmitting the first signal in the second channel; estimating a second power value in the first channel, while transmitting the first signal in the second channel, wherein the second power value is estimated based on at least the measured first power value and the first transmit power value; and measuring a third power value in the first channel, while transmitting the first signal in the second channel.

According to another aspect, there is provided a system configured to: measure a first power value in a first channel before transmitting a first signal in a second channel; determine a first transmit power value in the second channel for transmitting the first signal in the second channel; estimate a second power value in the first channel, while transmitting the first signal in the second channel, wherein the second power value is estimated based on at least the measured first power value and the first transmit power value; and measure a third power value in the first channel, while transmitting the first signal in the second channel.

According to another aspect, there is provided a method comprising measuring a first power value in a first channel before transmitting a first signal in a second channel; determining a first transmit power value in the second channel for transmitting the first signal in the second channel; estimating a second power value in the first channel, while transmitting the first signal in the second channel, wherein the second power value is estimated based on at least the measured first power value and the first transmit power value; and measuring a third power value in the first channel, while transmitting the first signal in the second channel.

According to another aspect, there is provided a computer program comprising instructions for causing an apparatus to perform at least the following: measure a first power value in a first channel before transmitting a first signal in a second channel; determine a first transmit power value in the second channel for transmitting the first signal in the second channel; estimate a second power value in the first channel, while transmitting the first signal in the second channel, wherein the second power value is estimated based on at least the measured first power value and the first transmit power value; and measure a third power value in the first channel, while transmitting the first signal in the second channel.

According to another aspect, there is provided a computer readable medium comprising program instructions for causing an apparatus to perform at least the following: measure a first power value in a first channel before transmitting a first signal in a second channel; determine a first transmit power value in the second channel for transmitting the first signal in the second channel; estimate a second power value in the first channel, while transmitting the first signal in the second channel, wherein the second power value is estimated based on at least the measured first power value and the first transmit power value; and measure a third power value in the first channel, while transmitting the first signal in the second channel.

According to another aspect, there is provided a non-transitory computer readable medium comprising program instructions for causing an apparatus to perform at least the following: measure a first power value in a first channel before transmitting a first signal in a second channel; determine a first transmit power value in the second channel for transmitting the first signal in the second channel; estimate a second power value in the first channel, while transmitting the first signal in the second channel, wherein the second power value is estimated based on at least the measured first power value and the first transmit power value; and measure a third power value in the first channel, while transmitting the first signal in the second channel.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
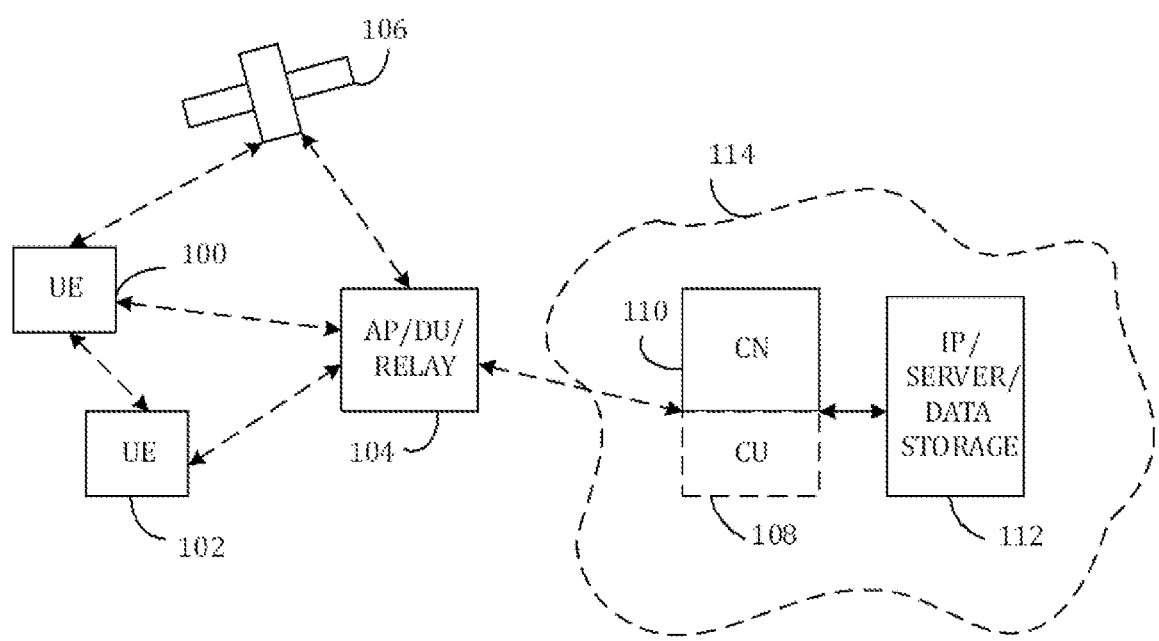
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Figure 2:
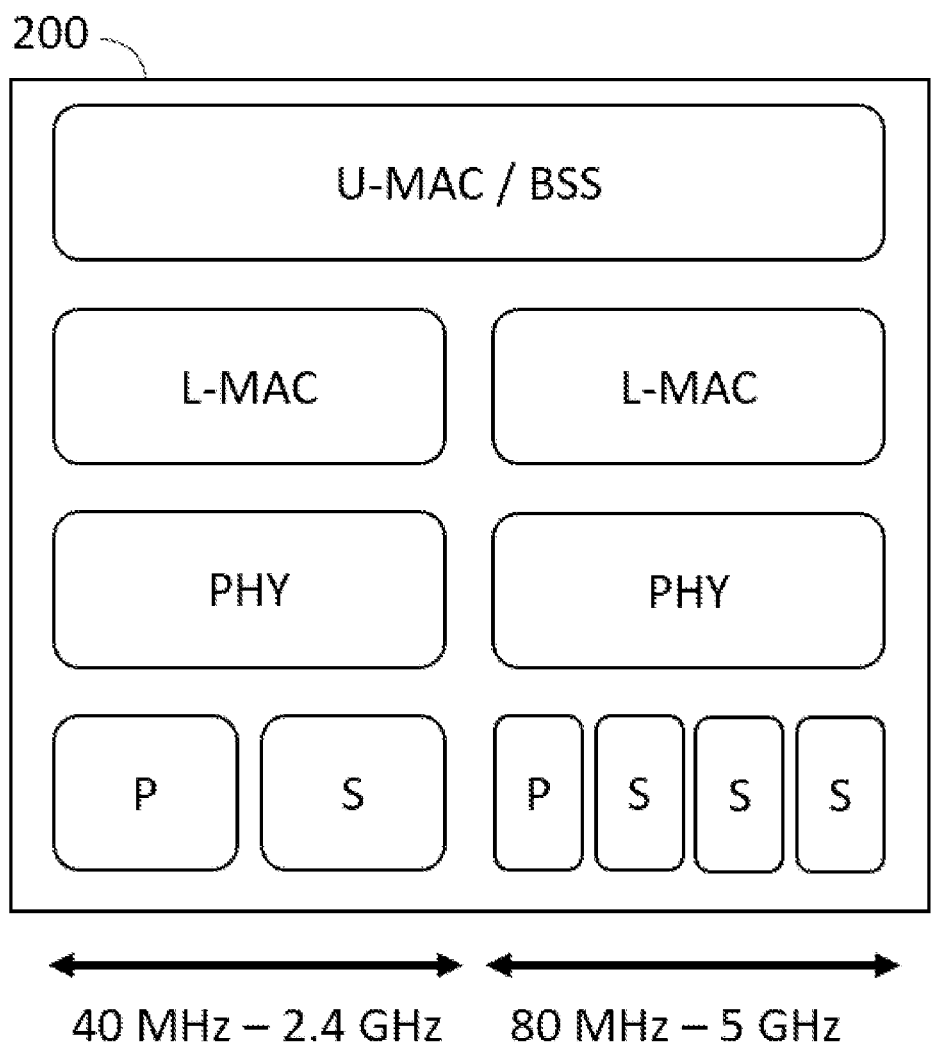
FIG. 2 illustrates a protocol stack of an apparatus according to an exemplary embodiment.

FIG. 2 illustrates a protocol stack 200 of an apparatus, which may also be referred to as a multi-link device, according to an exemplary embodiment. The protocol stack may comprise an upper medium access control layer, U-MAC, a basic service set, BSS, one or more lower medium access control layers, L-MAC, and/or one or more physical layers, PHY. The BSS may refer to a set of devices which may communicate with each other. A multi-link device may comprise a multi-link feature that may be used to allow devices to dynamically operate on several channels, or frequency bands, simultaneously. Multi-link devices, for example Wi-Fi devices, may perform virtual carrier sensing in a primary channel, P, while one or more secondary channels, S, are taken in use when available and possible for wider bandwidth. The primary channel and the one or more secondary channels may be 20 MHz wide, as an example. Multi-link devices may simultaneously use for example 2.4 GHz and 5 GHz channels. With this multi-link feature, packets may be delivered through any of the channels. An advantage of the multi-link feature may be that it may increase peak throughput, if multiple channels are used simultaneously, and/or it may decrease channel access delay, as devices may simultaneously perform listen before talk, LBT, on multiple channels and select for example the first available one for data transmission. LBT is a mechanism that may be used to check the interference signal level in a channel in a receiving mode before starting a transmission in the channel. In other words, by performing LBT, a radio transmitter may first sense its radio environment before starting a transmission in order to, for example, find a free radio channel to operate on based on a signal threshold level.

Some multi-link devices may operate in multiple channels of the same band with a radio frequency, RF, chain comprising a single transmitter, TX, and receiver, RX. Alternatively, some multi-link devices may operate in a pair of adjacent bands with two TX and RX chains. If the links are in adjacent frequency channels, a multi-link device may experience TX-to-RX intra-device inter-link interference, and thus may not be able to simultaneously transmit and receive in different channels. This may be referred to as a simultaneous transmit-and-receive, STR, constraint.

Figure 3:
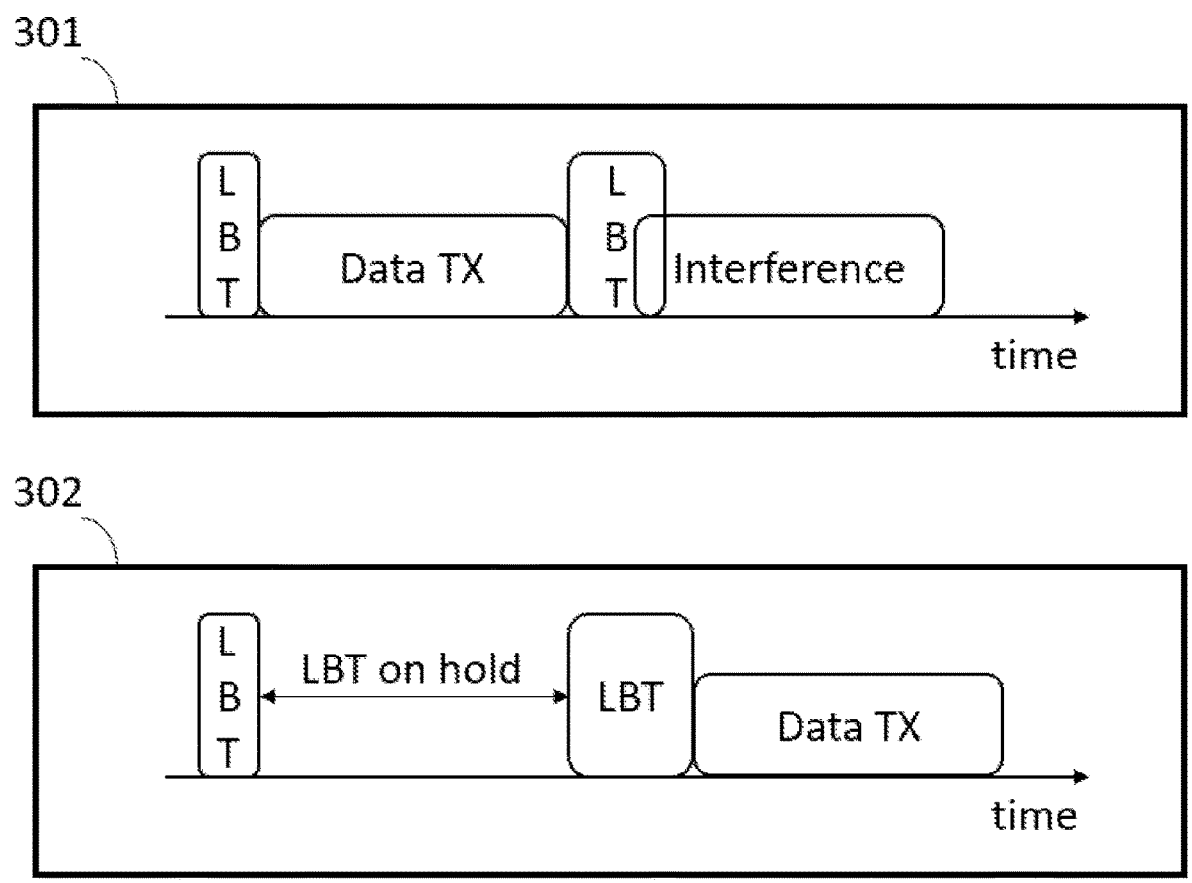
FIGS. 3 and 4 illustrate baseline operation for a multi-link device with simultaneous transmit-and-receive constraints.

FIG. 3 illustrates baseline operation for a multi-link device with simultaneous transmit-and-receive constraints. STR-constrained multi-link devices may not be able to perform LBT in one or more channels, for example a second channel 302, while transmitting in one or more other channels, for example a first channel 301. Therefore, the device may put the LBT on hold in one or more channels and resume the LBT at the end of the transmission in order to, for example, comply with unlicensed spectrum regulations. In other words, an STR-constrained baseline device performing a data transmission in a first channel 301 may not be able to simultaneously assess the state of a second channel 302, and thus may not be able to simultaneously perform LBT in the second channel 302. LBT may be performed during periods of interference, but the LBT backoff counter may not be decreased during interference.

Figure 4:
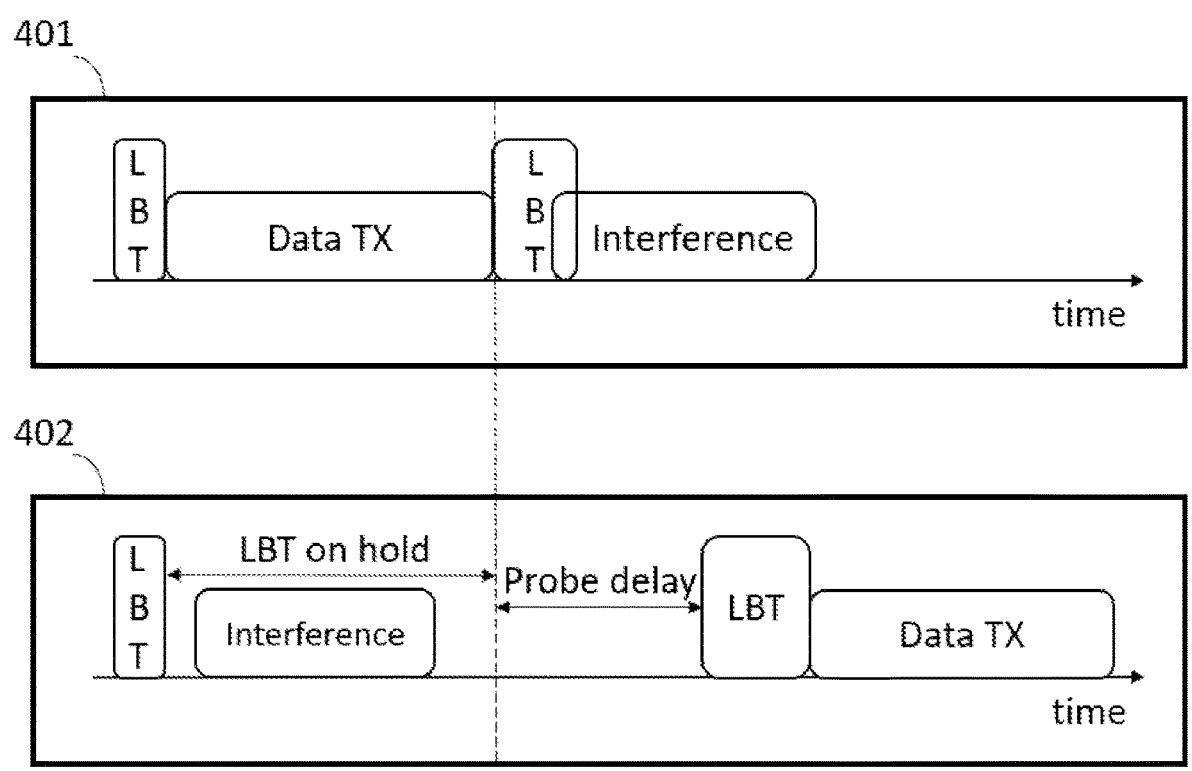

FIG. 4 illustrates baseline operation for a multi-link device with simultaneous transmit-and-receive constraints. The device may be based on, for example, the IEEE 802.11 Wi-Fi standard. In some technologies, such as Wi-FI, STR-constrained multi-link devices may introduce a delay period, which may be referred to as a probe delay, after finishing a transmission in one channel, for example a first channel 401, before resuming the LBT in one or more other channels, for example a second channel 402. In other words, an STR-constrained baseline device performing a data transmission in a first channel 401 may not be able to decode interfering transmissions for virtual carrier sensing purposes, for example a network allocation vector, NAV, in a second channel 402, and thus may apply a probe delay in the second channel 402 before restarting the LBT in order to avoid collisions with other 802.11 devices. When the device is able to operate again in the second channel 402 after the data transmission in the first channel 401, it may wait for the probe delay period or until it detects beginning of a valid Wi-Fi frame, whichever happens first, and then resumes the LBT. LBT may be performed during periods of interference, but the LBT backoff counter may not be decreased during interference.

While STR-constrained multi-link devices may not be able to perform simultaneous data reception in one or more channels while transmitting in one or more other channels, some exemplary embodiments may be used to allow multi-link devices to perform power measurements for the LBT in one or more channels, wherein the device is not transmitting. More specifically, some exemplary embodiments may be used to determine under which circumstances an STR-constrained multi-link device that performs a transmission in one or more unlicensed spectrum channels may simultaneously perform LBT and, as an example, decrease the related LBT channel access counter in one or more neighboring unlicensed channels. This determination may be based on whether the device evaluates the power measurement performed in the first channel to be reliable or not. This evaluation may be based on, for example, 1) a power measurement performed in the first channel prior to initiating the transmission in the second channel, 2) a power measurement performed in the first channel during the device's transmission in the second channel, 3) the transmission power of the device in the second channel, 4) the self-interference gain between the first channel and the second channel, which may depend on the transmission power used by the device in the second channel, and/or 5) a safety margin threshold. If the power measurement is evaluated to be non-reliable, the device may trigger a self-interference calibration procedure in order to be able to perform LBT and to decrease the backoff counter in future occasions.

Figure 5:
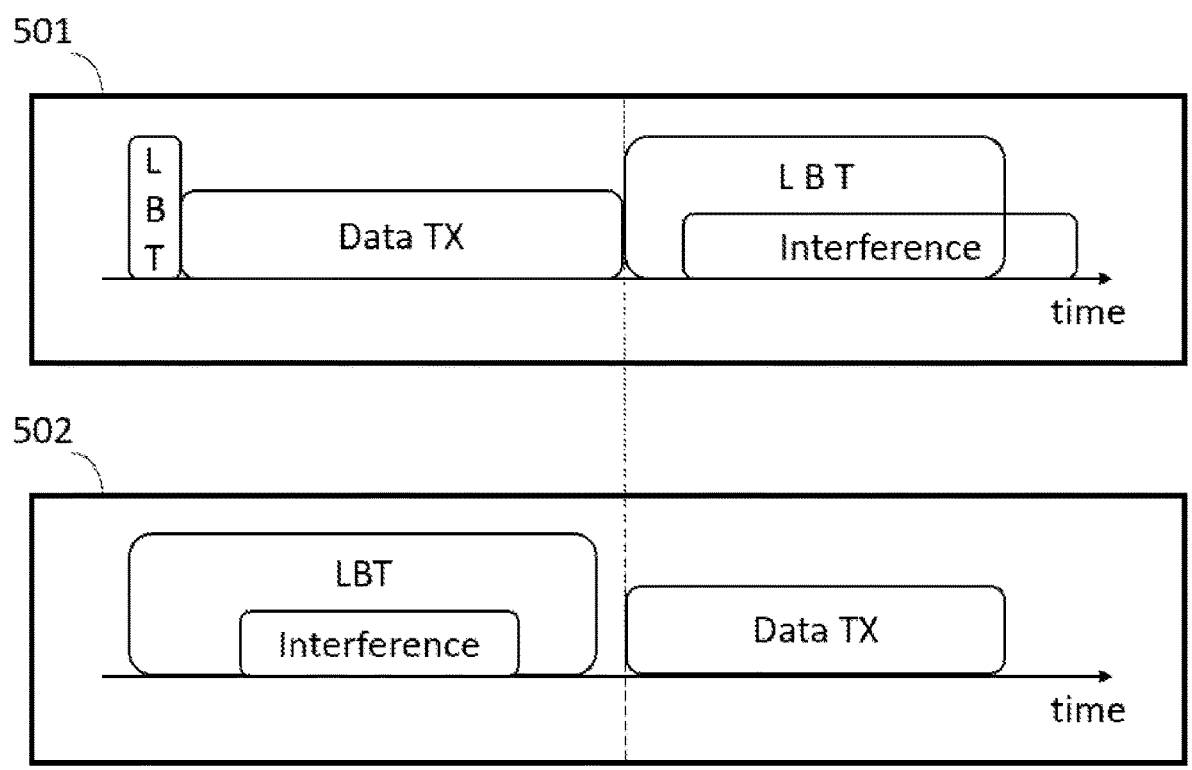
FIG. 5 illustrates operation for an apparatus according to an exemplary embodiment.

FIG. 5 illustrates operation for an apparatus, such as a multi-link device, according to an exemplary embodiment, wherein the device has simultaneous transmit-and-receive constraints. The device may perform the LBT in a second link 502, while simultaneously transmitting in a first link 501. Given that the duration of a data transmission may be in the order of several milliseconds, in this exemplary embodiment the device may experience significantly reduced channel access delays when compared to the operation of baseline devices, such as those illustrated in FIGS. 3 and 4. LBT may be performed during periods of interference.

Figure 6:
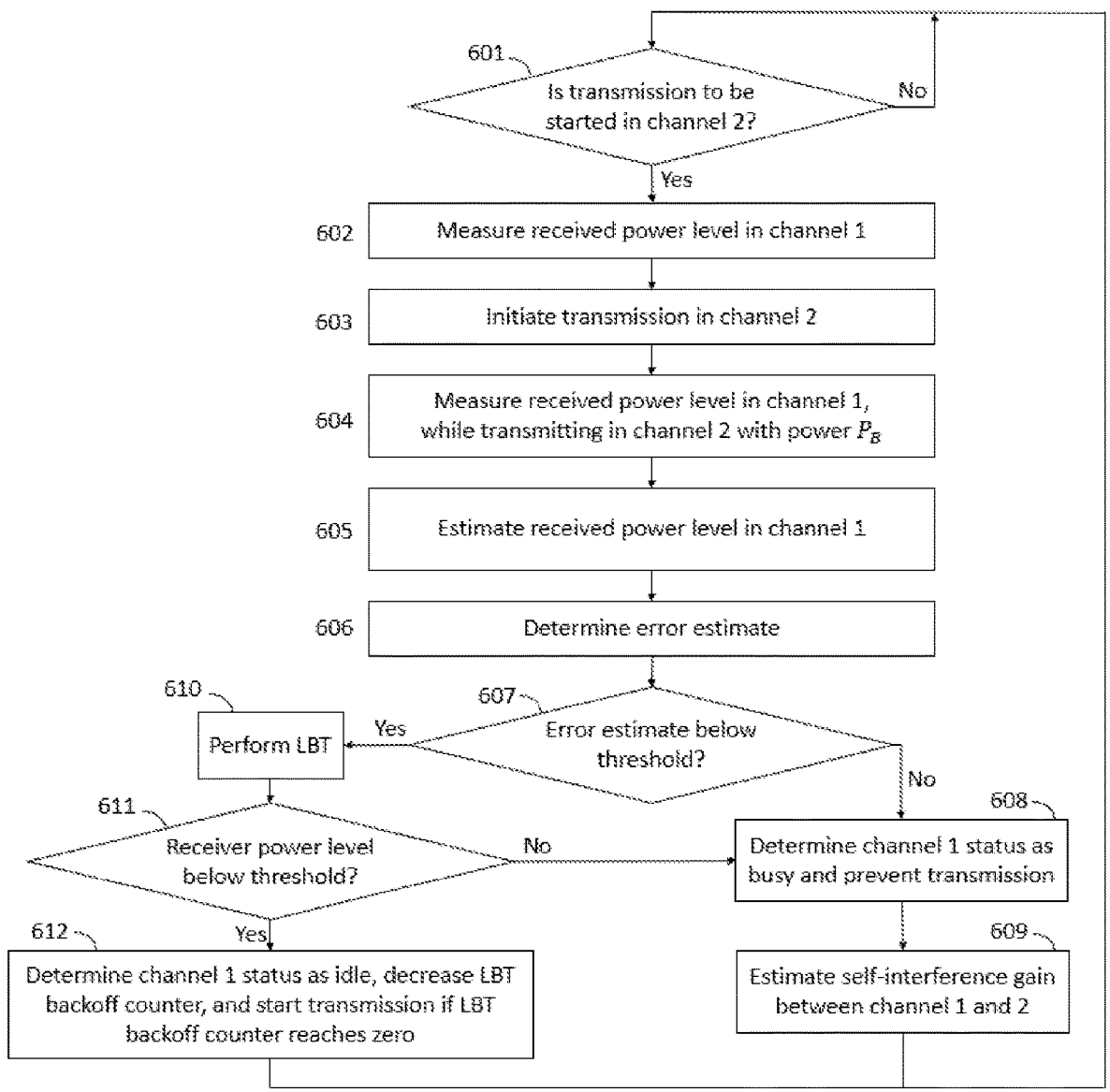
FIG. 6 illustrates a flow chart according to an exemplary embodiment.

FIG. 6 illustrates a flow chart according to an exemplary embodiment. The blocks and/or functions illustrated in FIG. 6 may be performed for example by a multi-link device, such as a terminal device, base station, wireless access point or any other wireless communication device. In block 601, it is determined if a transmission is about to be started in a second channel. If a transmission is about to be started (601: yes), a first received power level value, denoted as $S_A^1$, in a first channel at a first time instant is measured 602 before transmitting in the second channel. A transmission is then initiated 603 in the second channel with a TX power level denoted as $P_B$, which may also be referred to as a first transmit power value. The second channel may be different than the first channel. A second received power level value, denoted as $S_A^2$, in the first channel at a second time instant is then measured 604, while transmitting in the second channel with power $P_B$. The received power level, denoted as $\widehat{S_A}$, in the first channel is then estimated 605, or calculated, based on the measured first received power level value $S_A^1$, the TX power $P_B$, and an estimate of the self-interference gain between the first channel and the second channel. An error estimate, denoted as $\Delta$, is then determined 606, or calculated, wherein the error estimate is a function of the difference between the measured second received power level $S_A^2$ and the estimated received power level $\widehat{S_A}$. It is then evaluated 607 if the error estimate, or difference, is below or equal to a first pre-defined threshold, denoted as $\varepsilon$. The first threshold $\varepsilon$ may be an error estimate for the self-interference gain. The evaluation may be represented mathematically as:

$$\varepsilon \geq 10\log\left|S_A^2(mW) - \overline{[S_A^1(mW) + (P_B(mW) \times L_{B \to A}(P_B))]}\right|$$

where $L_{B \to A}(P_B)$ is an estimate of the self-interference gain between the first channel and the second channel, when TX power is $P_B$ in the second channel.

If the error estimate $\Delta$ is above the first threshold $\varepsilon$ (607: no), the status, for example a clear channel assessment, CCA, of the first channel is determined 608 as busy, and decrease of LBT backoff counter and transmission, as an example, are prevented. In some exemplary embodiments, the error estimate $\Delta$ exceeding the first threshold $\varepsilon$ may be interpreted as an inaccurate self-interference measurement which, as an example, may prevent CCA to be performed in the first channel. A probe delay period at the end of the transmission in the second channel may be applied for example in Wi-Fi to prevent any collisions due to missing NAVs. A self-interference calibration may then be triggered to estimate 609 self-interference gain between the first channel and the second channel at TX power $P_B$, which may be beneficial in accurately capturing the non-linear and non-static behaviour of the hardware components.

If the error estimate $\Delta$ is below the first threshold $\varepsilon$ (607: yes), the self-interference measurement, or cancellation, may be considered to be accurate, and energy-based CCA in the first channel may be possible while transmitting in the second channel. Thus, LBT may be performed 610 while transmitting in the second channel. It is then evaluated 611 if the second received power level $S_A^2$ is below a second threshold, denoted as $\sigma$. This evaluation may be represented mathematically as:

$$S_A^2(dBm) \leq \overline{T(dBm) - \omega(dB)}$$

where T(dBm) is the clear channel access power threshold, and $\omega$(dB) is a safety margin value determined for example as a function of the device capabilities. As a consequence, the device may check if the received power level, not considering or suppressing self-interference, satisfies the above equation for example with T=−72 dBm, to decrease the backoff counter while transmitting. Additionally, the device may check if the received power level, not considering or suppressing self-interference, satisfies the above equation for example with T=−82 dBm, and apply a probe delay if a transmission is detected.

If the measured second receiver power level is not below the second threshold (611: no), the process continues to block 608, which is described above.

If the measured second receiver power level is below the second threshold (611: yes), the status of the first channel is determined 612 as idle, and the LBT backoff counter is decreased. A transmission is started in the first channel, if the LBT backoff counter reaches zero.

The process described above may be iterative, so that after block 612 or 609 it goes back to block 601 and continues from there.

Figure 7:
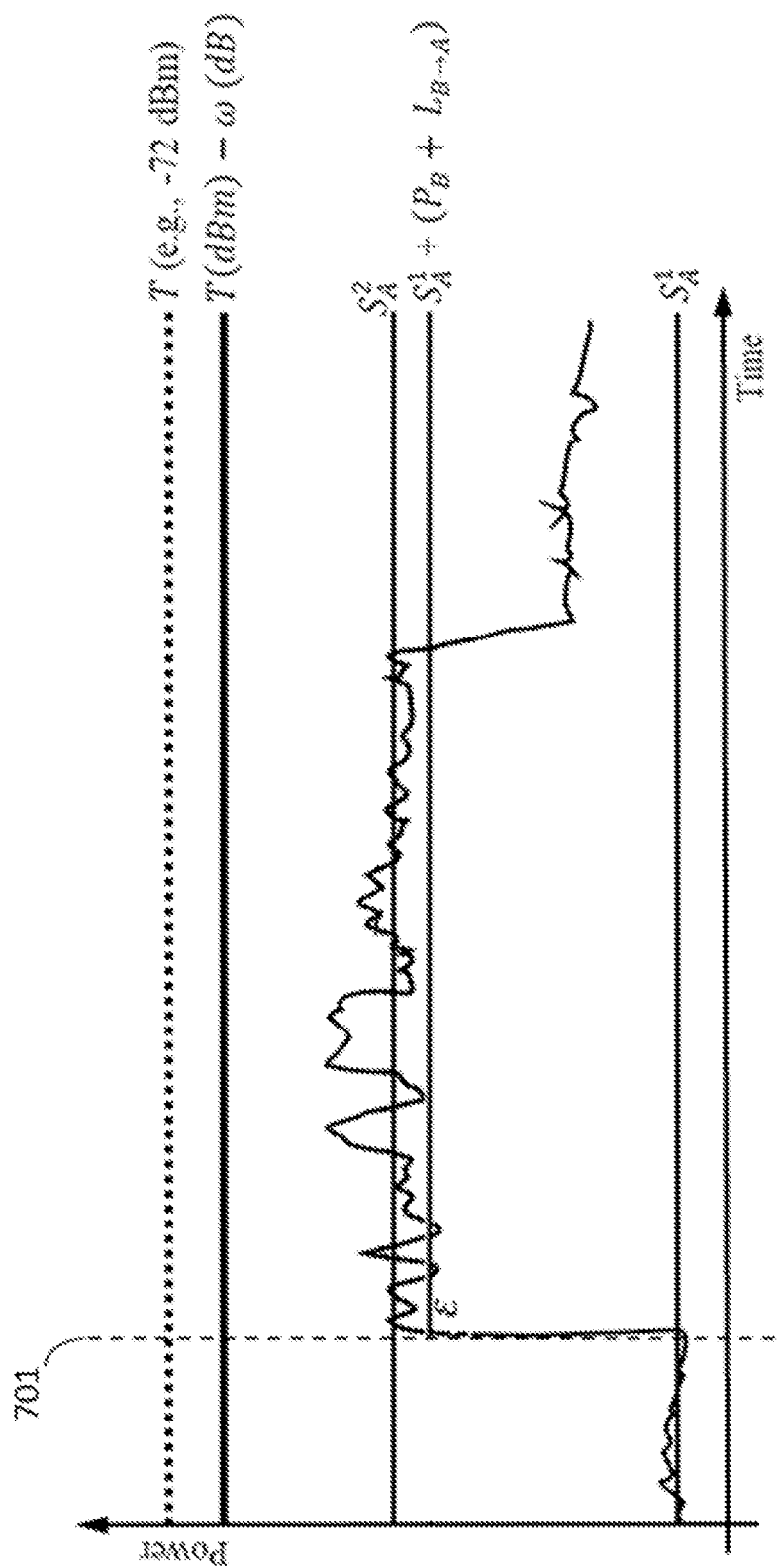
FIGS. 7 and 8 illustrate measurement results according to exemplary embodiments.

FIG. 7 illustrates examples of power measurements for the first channel according to an exemplary embodiment, wherein a multi-link device measures a power below the channel access threshold, i.e. in block 611 of FIG. 6. The device may decrease the backoff counter in the first channel, since the power measurement is deemed accurate in block 607 of FIG. 6. Point 701 in FIG. 7 indicates the time instant, when the multi-link device starts transmitting in the second channel.

Figure 8:
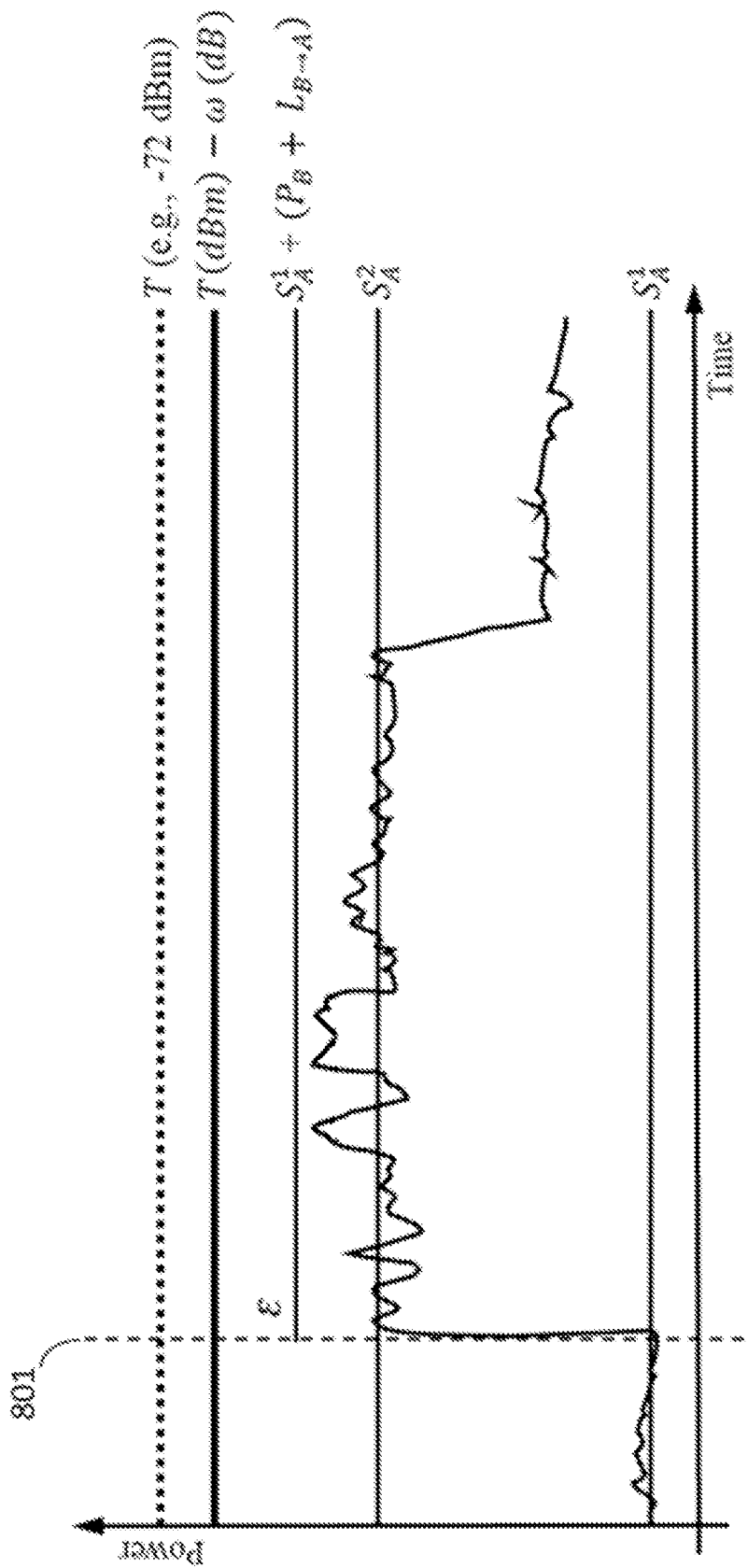

FIG. 8 illustrates examples of power measurements for the first channel according to an exemplary embodiment. In this example, in spite of measuring a power below the channel access threshold, the device may not access the channel, since the power measurement is not deemed accurate in block 607 of FIG. 6. This may happen, for example, when the characterization of the self-interference cancellation process is not accurate, i.e. recalibration may be required, and/or the self-interference cancellation process is suppressing part of an incoming signal, i.e. not a self-generated one, in the first channel. Point 801 in FIG. 8 indicates the time instant, when the multi-link device starts transmitting in the second channel.

It should be noted that in some circumstances the device may not decrease the LBT backoff counter in the second channel even if the energy measurement is for example below a regulatory threshold. This may be because, if the device cannot guarantee that the self-interference cancellation, or estimate, is accurate, it may not consider the resulting power measurement as valid for determining whether the medium is busy or idle, since the result of that power measurement may not be reliable.

The calibration of the leakage power ratio $L_{B \to A}(P_B)$ may be performed for example by transmitting packets with different TX power levels on the second channel to determine the leakage to the first channel. Although the physical leakage ratio may be independent of the TX power, the amount of power emitted on the adjacent band may be determined by the nonlinearity of the power amplifier, which may be affected by the TX power level. It may be beneficial to have the leakage ratio consider both of these phenomena and constitute a single quantity defining the amount of self-interference power leakage to the adjacent channel.

Figure 9:
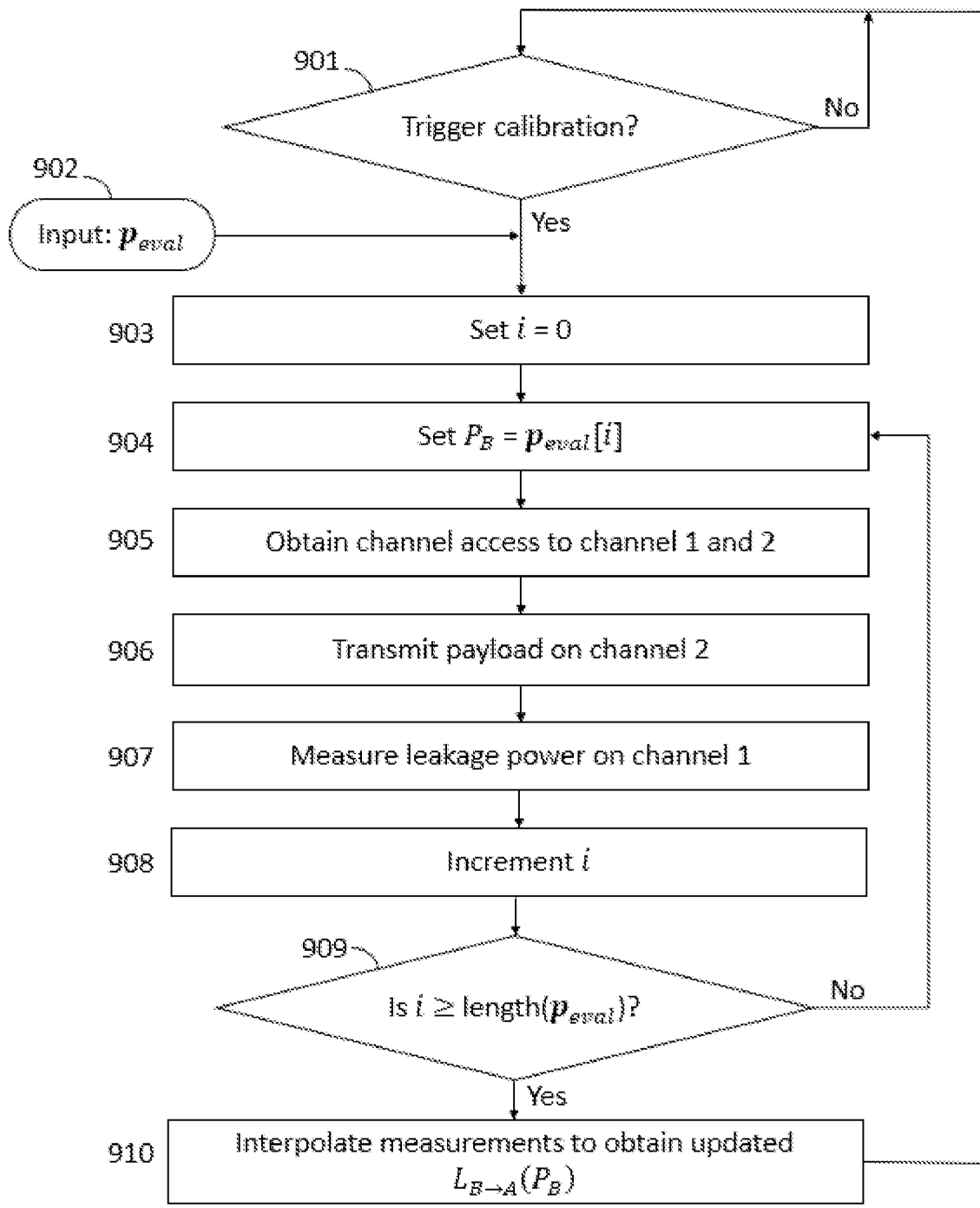
FIGS. 9 and 10 illustrate flow charts according to exemplary embodiments.

FIG. 9 illustrates a flow chart for performing a self-interference calibration procedure (block 609 in FIG. 6) according to an exemplary embodiment. The evaluated TX power level values may be comprised in a data structure such as a vector, denoted as $p_{eval}$. During the calibration, the device may go through each TX power level value in the vector, transmitting a data packet on the second channel with an associated TX power level indicated by the vector after gaining access to both the first and second channel, and records the observed power on the first channel, i.e. the leakage power associated with each TX power level value in the vector. After obtaining the transmit power-leakage power pairs, for example a continuous function between the TX power and leakage ratio may be defined by fitting a curve to the measurement points.

Referring to FIG. 9, in block 901 it is determined whether a self-interference calibration is triggered or not. For example, the self-interference calibration may be triggered when the condition of block 607 in FIG. 6 is not satisfied (607: no) for a pre-defined number of consecutive timeslots. A single measurement may not be representative of a self-calibration issue, since, for instance, an interferer may have started a transmission.

If the calibration is triggered (901: yes), in block 902, a plurality of TX power values are obtained, or received, for example in a vector $p_{eval}$ comprising one or more transmit power values. In block 903, an index i is set as zero. In block 904, the transmitter power level $P_B$ of the device in the second channel is set to equal the i-th element, i.e. transmit power value, in the vector $p_{eval}$. In block 905, channel access to the first channel and to the second channel is obtained. It may be beneficial to allocate the first channel for the duration of the measurement performed in block 907. If the first channel is not reserved, other devices may take it in use and prevent, or at least hinder, the measurement. For example, clear-to-send-to-self, CTS-to-self, may be used by having it transmitted synchronously in both channels in the beginning of the sequence.

Once both channels are reserved for example by transmitting CTS-to-self, in block 906 a payload, for example one or more data packets or frames, is transmitted on the second channel with the transmit power $P_B$. In block 907, the leakage power level on the first channel is recorded, or measured, while transmitting the payload on the second channel. In block 908, the index i is incremented by one.

In block 909, it is evaluated if the index i is greater than or equal to the length of the vector $p_{eval}$, wherein the length of the vector is the number of elements comprised in the vector. In other words, it is checked if all the elements in the vector have been processed. If all the elements in the vector have been processed (909: yes), in block 910 the measurements are interpolated to obtain an updated leakage power ratio $L_{B\rightarrow A}(P_B)$ The process may be iterative so that after block 910 it returns to block 901 and continues from there.

If all of the elements in the vector have not been processed (909: no), the process returns to block 904 and continues from there.

Figure 10:
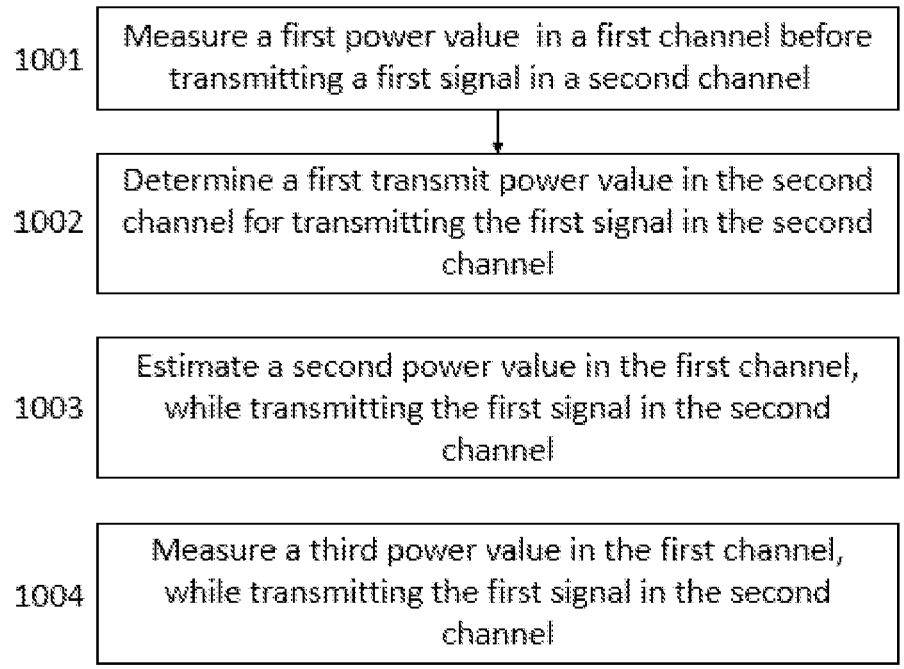

FIG. 10 illustrates a flow chart according to an exemplary embodiment. In block 1001, a first power value in a first channel is measured before transmitting a first signal in a second channel. In block 1002, a first transmit power value in the second channel is determined for transmitting the first signal in the second channel. In block 1003, a second power value in the first channel is estimated, while transmitting the first signal in the second channel, wherein the second power value is estimated based on at least the measured first power value and the first transmit power value. In block 1004, a third power value in the first channel is measured, while transmitting the first signal in the second channel.

The functions and/or blocks described above by means of FIGS. 6, 9 and 10 are in no absolute chronological order, and some of them may be performed simultaneously or in an order differing from the described one. Other functions and/or blocks may also be executed between them or within them.

A technical advantage provided by some exemplary embodiments may be that they may enable running LBT in a first channel, while transmitting in a second channel, even if some of the power transmitted on the second channel leaks to the first channel. Furthermore, the complexity of implementations required for measuring the power of a received signal with self-interference according to some exemplary embodiments may be lower than that of implementations that, for example, attempt to fully decode signals under the presence of such self-interference. Therefore, some exemplary embodiments may reduce channel access delays and/or increase bit rates, while maintaining regulatory compliance and fairness with legacy devices, for example.

Figure 11:
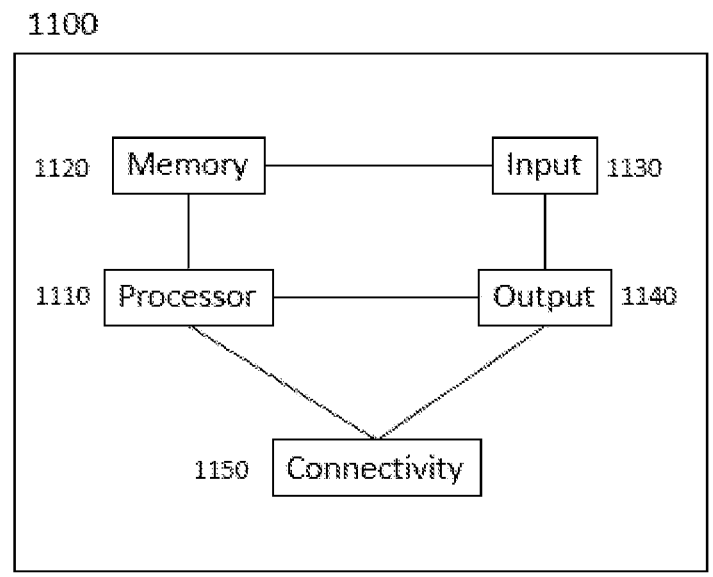
FIGS. 11 and 12 illustrate apparatuses according to exemplary embodiments.

FIG. 11 illustrates an apparatus 1100, which may be an apparatus such as, or comprised in, a terminal device, according to an exemplary embodiment. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application specific integrated circuits, ASICs.

The processor 1110 is coupled to a memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1120 stores computer readable instructions that are executed by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1100 may further comprise, or be connected to, an input unit 1130. The input unit 1130 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1130 may comprise an interface to which external devices may connect to.

The apparatus 1100 may also comprise an output unit 1140. The output unit may comprise or be connected to one or more displays capable of rendering visual content such as a light emitting diode, LED, display, a liquid crystal display, LCD and a liquid crystal on silicon, LCoS, display. The output unit 1140 may further comprise one or more audio outputs. The one or more audio outputs may be for example loudspeakers.

The apparatus 1100 further comprises a connectivity unit 1150. The connectivity unit 1150 enables wireless connectivity to one or more external devices. The connectivity unit 1150 comprises at least one transmitter and at least one receiver that may be integrated to the apparatus 1100 or that the apparatus 1100 may be connected to. The at least one transmitter comprises at least one transmission antenna, and the at least one receiver comprises at least one receiving antenna. The connectivity unit 1150 may comprise an integrated circuit or a set of integrated circuits that provide the wireless communication capability for the apparatus 1100. Alternatively, the wireless connectivity may be a hardwired application specific integrated circuit, ASIC. The connectivity unit 1150 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1100 may further comprise various components not illustrated in FIG. 11. The various components may be hardware components and/or software components.

Figure 12:
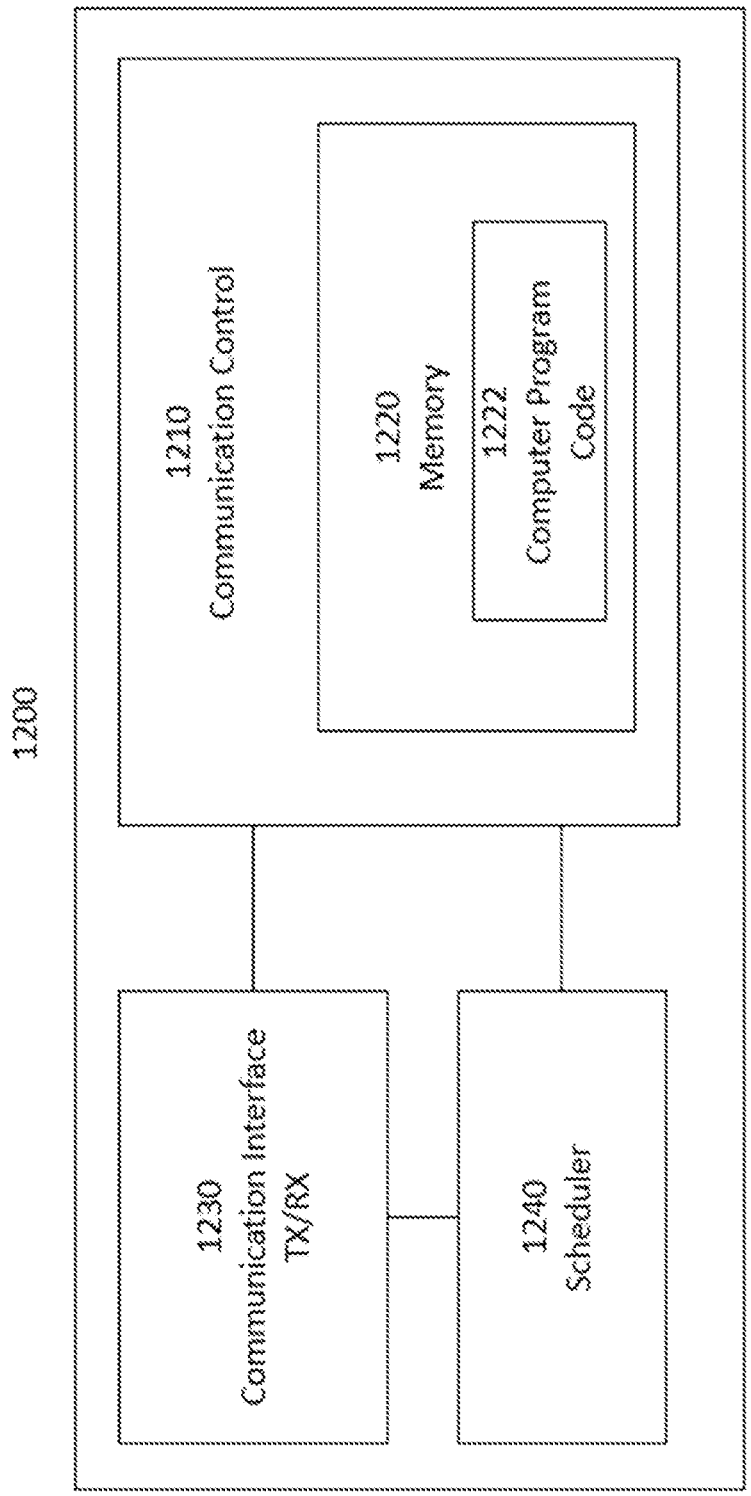

The apparatus 1200 of FIG. 12 illustrates an exemplary embodiment of an apparatus that may be a base station or a wireless access point, or comprised in a base station or a wireless access point. The apparatus may comprise, for example, a circuitry or a chipset applicable to a base station to realize some of the described exemplary embodiments. The apparatus 1200 may be an electronic device comprising one or more electronic circuitries. The apparatus 1200 may comprise a communication control circuitry 1210 such as at least one processor, and at least one memory 1220 including a computer program code (software) 1222 wherein the at least one memory and the computer program code (software) 1222 are configured, with the at least one processor, to cause the apparatus 1200 to carry out some of the exemplary embodiments described above.

The memory 1220 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store a current neighbour cell list, and, in some exemplary embodiments, structures of the frames used in the detected neighbour cells.

The apparatus 1200 may further comprise a communication interface 1230 comprising hardware and/or software for realizing communication connectivity according to one or more communication protocols. The communication interface 1230 may provide the apparatus with radio communication capabilities to communicate in the cellular communication system. The communication interface may, for example, provide a radio interface to terminal devices. The apparatus 1200 may further comprise another interface towards a core network such as the network coordinator apparatus and/or to the access nodes of the cellular communication system. The apparatus 1200 may further comprise a scheduler 1240 that is configured to allocate resources.

As used in this application, the term "circuitry" may refer to one or more or all of the following:
  a. hardware-only circuit implementations (such as implementations in only analog and/or digital circuitry) and
  b. combinations of hardware circuits and software, such as (as applicable):
    i. a combination of analog and/or digital hardware circuit(s) with software/firmware and
    ii. any portions of hardware processor(s) with software (including digital signal processor(s)), software, and memory(ies) that work together to cause an apparatus, such as a mobile phone, to perform various functions) and
  c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus (es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory storing instructions that, when executed by the at least one processor, cause the apparatus to:
    measure a first power value in a first channel before transmitting a first signal in a second channel;
    determine a first transmit power value in the second channel for transmitting the first signal in the second channel;
    estimate a second power value in the first channel, while transmitting the first signal in the second channel, wherein the second power value is estimated based on at least the measured first power value and the first transmit power value; and
    measure a third power value in the first channel, while transmitting the first signal in the second channel.

2. An apparatus according to claim 1, wherein the instructions, when executed by the at least one processor, further cause the apparatus to: compare the estimated second power value and the measured third power value; and based on the comparing, determine if a status of the first channel is idle or busy.

3. An apparatus according to claim 1, wherein the instructions, when executed by the at least one processor, further cause the apparatus to:
    perform listen-before-talk in the first channel while transmitting the first signal in the second channel, if a difference between the estimated second power value and the measured third power value is smaller than or equal to a first pre-defined threshold value.

4. An apparatus according to claim 1, wherein the instructions, when executed by the at least one processor, further cause the apparatus to:
    decrease a backoff counter value in the first channel while transmitting the first signal in the second channel, if a difference between the estimated second power value and the measured third power value is smaller than or equal to a first pre-defined threshold value, and if the measured third power value is smaller than or equal to a second pre-defined threshold value; and
    transmit the second signal in the first channel after transmitting the first signal in the second channel, if the decreased backoff counter value equals zero.

5. An apparatus according to claim 2, wherein a probe delay period is applied if the first channel is determined to be busy.

6. An apparatus according to claim 1, wherein the instructions, when executed by the at least one processor, further cause the apparatus to:
    estimate an interference between the second channel and the first channel;
    wherein the estimating of the second power value is further based on the estimated interference between the second channel and the first channel.

7. An apparatus according to claim 6, wherein the instructions, when executed by the at least one processor, further cause the apparatus to adjust a leakage power ratio, wherein the leakage power ratio is used for estimating the interference, and wherein the leakage power ratio is adjusted by:
    transmitting a plurality of data packets in the second channel with a plurality of transmitter power levels;
    measuring a plurality of fourth power values in the first channel, while transmitting the plurality of data packets in the second channel;
    comparing the measured fourth power values with the associated transmitter power levels; and
    updating the leakage power ratio based on the comparison of the fourth power values and the associated transmitter power levels.

8. An apparatus according to claim 7, wherein the leakage power ratio is adjusted, if the difference between the estimated second power value and the measured third power value exceeds the first pre-defined threshold value.

9. An apparatus according to claim 1, wherein the first channel and the second channel are in adjacent frequency channels.

10. An apparatus according to claim 1, wherein the apparatus is comprised in a terminal device or a base station or a wireless access point.

11. A method comprising:
    measuring a first power value in a first channel before transmitting a first signal in a second channel;
    determining a first transmit power value in the second channel for transmitting the first signal in the second channel;
    estimating a second power value in the first channel, while transmitting the first signal in the second channel, wherein the second power value is estimated based on at least the measured first power value and the first transmit power value; and
    measuring a third power value in the first channel, while transmitting the first signal in the second channel.

12. A non-transitory computer readable medium comprising program instructions that, when executed by an apparatus, cause the apparatus to perform at least the following:
    measure a first power value in a first channel before transmitting a first signal in a second channel;
    determine a first transmit power value in the second channel for transmitting the first signal in the second channel;
    estimate a second power value in the first channel, while transmitting the first signal in the second channel, wherein the second power value is estimated based on at least the measured first power value and the first transmit power value; and
    measure a third power value in the first channel, while transmitting the first signal in the second channel.

13. The method according to claim 11, further comprising:
    comparing the estimated second power value and the measured third power value; and
    based on the comparing, determining if a status of the first channel is idle or busy.

14. The method according to claim 13, wherein a probe delay period is applied if the first channel is determined to be busy.

15. The method according to claim 11, further comprising:
    performing listen-before-talk in the first channel while transmitting the first signal in the second channel, if a difference between the estimated second power value and the measured third power value is smaller than or equal to a first pre-defined threshold value.

16. The method according to claim 11, further comprising:
- decreasing a backoff counter value in the first channel while transmitting the first signal in the second channel, if a difference between the estimated second power value and the measured third power value is smaller than or equal to a first pre-defined threshold value, and if the measured third power value is smaller than or equal to a second pre-defined threshold value; and
- transmitting the second signal in the first channel after transmitting the first signal in the second channel, if the decreased backoff counter value equals zero.

17. The method according to claim 11, further comprising:
- estimating an interference between the second channel and the first channel;
- wherein the estimating of the second power value is further based on the estimated interference between the second channel and the first channel.

18. The method according to claim 17, further comprising adjusting a leakage power ratio, wherein the leakage power ratio is used for estimating the interference, and wherein the leakage power ratio is adjusted by:
- transmitting a plurality of data packets in the second channel with a plurality of transmitter power levels;
- measuring a plurality of fourth power values in the first channel, while transmitting the plurality of data packets in the second channel;
- comparing the measured fourth power values with the associated transmitter power levels; and
- updating the leakage power ratio based on the comparison of the fourth power values and the associated transmitter power levels.

19. The method according to claim 18, wherein the leakage power ratio is adjusted, if the difference between the estimated second power value and the measured third power value exceeds the first pre-defined threshold value.

20. The method according to claim 11, wherein the first channel and the second channel are in adjacent frequency channels.

* * * * *